(12) United States Patent
Rafferty et al.

(10) Patent No.: US 6,324,605 B1
(45) Date of Patent: Nov. 27, 2001

(54) COMPUTER AND PERIPHERAL SWITCH WITH USB

(75) Inventors: Jarrod S. Rafferty, Kent; Elizabeth L. Craddock, Lyndhurst, both of OH (US)

(73) Assignee: Network Technologies, Inc., Aurora, OH (US)

( * ) Notice: Subject to any disclaimer, the term of this patent is extended or adjusted under 35 U.S.C. 154(b) by 0 days.

(21) Appl. No.: 09/209,016

(22) Filed: Dec. 10, 1998

(51) Int. Cl.[7] .................................................. G06F 13/00
(52) U.S. Cl. ........................... 710/100; 710/131; 710/129; 710/62; 710/63
(58) Field of Search ..................................... 710/100, 101, 710/129, 131, 62, 63, 8, 105, 10, 103

(56) References Cited

U.S. PATENT DOCUMENTS

| | | |
|---|---|---|
| 4,468,612 | 8/1984 | Starr . |
| 4,876,712 | 10/1989 | Brint et al. . |
| 4,972,470 | 11/1990 | Farago . |
| 5,181,858 | 1/1993 | Matz et al. . |
| 5,226,123 | 7/1993 | Vockenhuber . |
| 5,330,370 | 7/1994 | Reddersen et al. . |
| 5,347,113 | 9/1994 | Reddersen et al. . |
| 5,369,593 | 11/1994 | Papamarcos et al. . |
| 5,524,362 | 6/1996 | Quandt et al. . |
| 5,542,053 | 7/1996 | Bland et al. . |
| 5,613,096 | 3/1997 | Danknick . |
| 5,664,229 | 9/1997 | Bhargava et al. . |
| 5,699,533 | 12/1997 | Sakai . |
| 5,721,842 | 2/1998 | Beasley et al. . |
| 5,724,529 | 3/1998 | Smith et al. . |
| 5,734,334 | 3/1998 | Hsieh et al. . |
| 5,752,032 | 5/1998 | Keller et al. . |
| 5,758,099 | 5/1998 | Grieco et al. . |
| 5,761,447 | 6/1998 | Knox et al. . |
| 5,761,448 | 6/1998 | Adamson et al. . |
| 5,768,568 | 6/1998 | Inui et al. . |
| 5,781,748 | 7/1998 | Santos et al. . |
| 5,784,702 | 7/1998 | Greenstein et al. . |
| 5,799,171 | 8/1998 | Kondou . |
| 5,835,791 | * 11/1998 | Goff et al. ............................. 710/62 |
| 5,864,708 | * 1/1999 | Croft et al. . |
| 5,935,224 | * 8/1999 | Svancarek et al. ..................... 710/63 |
| 6,044,428 | * 3/2000 | Rayabhari ............................. 710/129 |
| 6,151,645 | * 11/2000 | Young et al. .......................... 710/63 |

FOREIGN PATENT DOCUMENTS

| | | |
|---|---|---|
| 0982663 A2 | 3/2000 | (EP) . |
| 0 962 663 A2 | * 3/2000 | (EP) ............................... G06F/13/40 |
| 100187303 A | 7/1998 | (JP) . |
| 98/12641 A1 | 3/1998 | (WO) . |

OTHER PUBLICATIONS

MacWeek vol. 12, No. 29, Aug. 3, 1998, Christina Follman, "Griffin to grant iMac ADB port.", p. 23.

"iMate USB to ADB Adapter", available from http://www-.griffintechnology.com/imac/imate_ds.html.

* cited by examiner

Primary Examiner—Ario Etienne
(74) Attorney, Agent, or Firm—Pearne & Gordon LLP

(57) ABSTRACT

A switch for connecting a desired peripheral to a desired computer uses a peripheral interface to translate either Universal Serial Bus (USB) or non-USB peripheral data to a common data format, the data is then routed to a computer interface that translates the common data format to either USB or non-USB computer data.

15 Claims, 2 Drawing Sheets

COMPUTER AND PERIPHERAL SWITCH WITH USB

BACKGROUND OF THE INVENTION

The present invention relates to a switch for selectively attaching desired computer peripherals to a desired computer and, in particular, to the case where one or more of the peripherals and/or computers requires a Universal Serial Bus connection.

It is often desirable to control multiple computers with a single keyboard/video/mouse (KVM) combination. It is also often desirable to be able to control a single computer from one of several KVM combinations or to be able to select from both multiple KVM combinations and multiple computers. Many KVM switches that handle conventional keyboards and mice have been made and sold.

Universal Serial Bus (USB) is a peripheral bus standard developed by the PC and telecom industry, including Compaq, DEC, IBM, Intel, Microsoft, NEC and Northern Telecom. USB defines a bus and protocols for the connection of computer peripherals to computers (and to each other). "Universal Serial Bus Specification", Compaq, Intel, Microsoft, NEC, Revision 1.1, Sep. 23, 1998, describes USB and its implementation and is incorporated herein by reference. Proposed and actual USB devices include keyboards, mice, telephones, digital cameras, modems, digital joysticks, CD-ROM drives, tape and floppy drives, digital scanners, printers, MPEG-2 video-base products, and data digitizers and other relatively low bandwidth devices. USB supports data rates of up to 12 Mbits/sec.

Present KVM switches are designed to connect conventional keyboards and mice to conventional keyboard and mouse input ports of computers. The advent of USB presents an obstacle for present KVM switches. For example, it is desirable to be able to connect a non-USB mouse and keyboard to any one of a group of both USB and non-USB computers using a KVM switch or to connect any one of a group of both USB and non-USB keyboard and mouse combinations to a single USB computer. As a further example, it may be desirable to switchably connect other USB or non-USB peripherals to USB or non-USB computers. Present KVM switches cannot switchably select USB devices, much less connect USB to non-USB devices.

SUMMARY OF THE INVENTION

A switch for connecting a computer peripheral to a computer is provided. The switch includes at least one of a USB peripheral interface and a non-USB peripheral interface. The at least one peripheral interface is operably connectable to the computer peripheral. The switch also includes at least one of a USB computer interface and a non-USB computer interface. The at least one computer interface is operably connectable to the computer. At least one of the at least one peripheral interface and the at least one computer interface is a USB interface. The switch further includes a switcher for selectively establishing communication between a desired peripheral interface and a desired computer interface.

DESCRIPTION OF THE PREFERRED EMBODIMENTS

Figure 1:
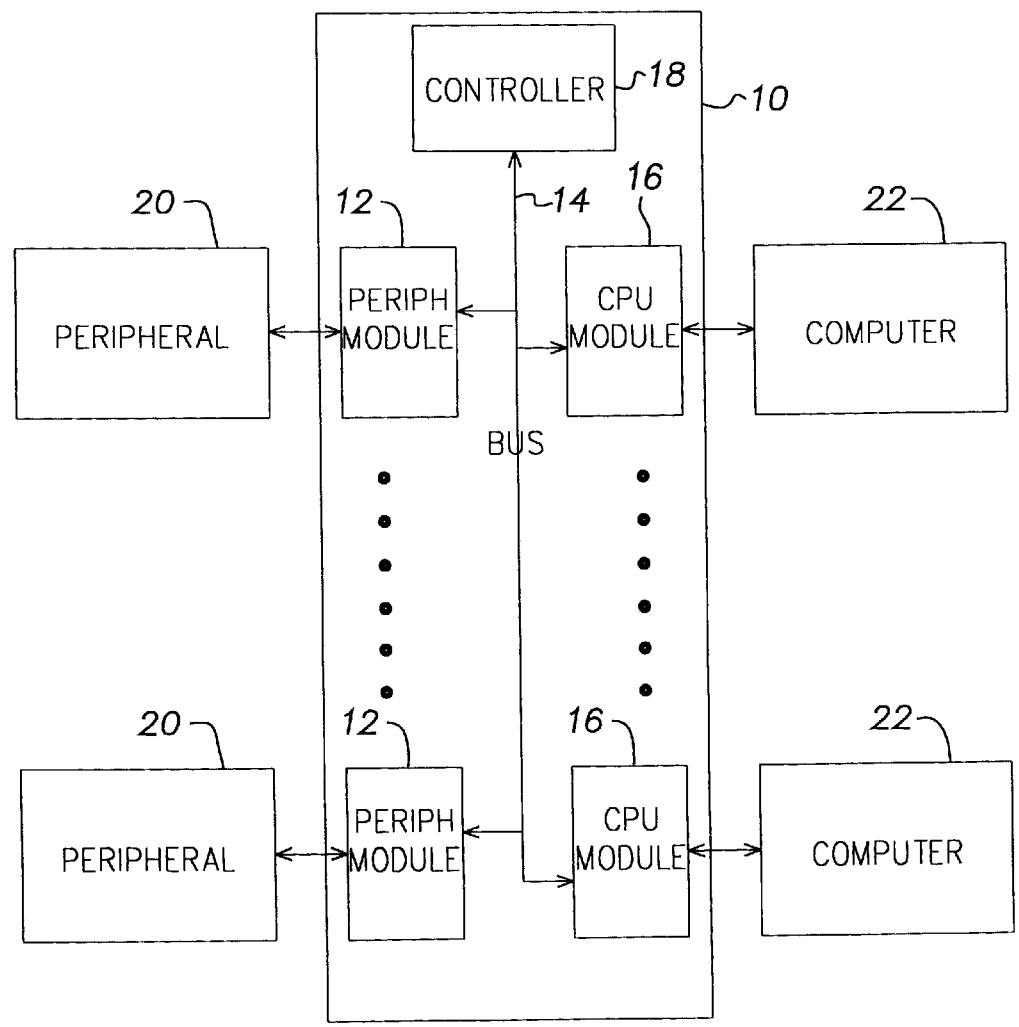
FIG. 1 is a block diagram of a switch according to the invention connected to multiple computer peripherals and computers.

Referring to FIG. 1, a switch 10 includes peripheral modules 12 connected to a central bus 14. There may be, for example, eight peripheral modules, but there may be more or less. CPU or computer modules 16 are also connected to the central bus 14. There may be, for example, thirty-two computer modules, hut there may be more or less. The bus 14 is also connected to the controller 10.

A peripheral module 12 may act as an interface for both non-USB peripherals (e.g., a conventional mouse and keyboard) and USB peripherals (e.g., mouse, keyboard, modem, printer, scanner, audio device, game controller, or other, relatively low bandwidth device). Alternatively, USB and non-USE peripheral interfaces may each be in separate modules or not modularized at all.

Similarly, a computer module 16 may act as an interface for both non-USB computers and USB computers. Alternatively, USB and non-USB computer interface may earth be in separate modules or not modularized at all.

The peripheral module 12 receives digital data from an attached peripheral 20. Based on the type of peripheral connected, the peripheral module 12 encodes the data onto the bus 14. As part of the encoding process, an "address" of the desired destination of the peripheral signal is included with the encoded signal. This address corresponds to one of the computer modules 16 or to the controller 18. The peripheral module 12 may be implemented, for example, by a cpu, memory and i/o circuits; a single chip computer; an application specific integrated circuit; field programmable gate arrays; or other programmable circuits.

The bus 14 may be, for example, a $i^2c$ bus. The $j^2c$ bus is a two-wire bidirectional bus based on a standard developed by Philips Electronics.

The computer module 16 sends digital data to an attached computer 22. Based Un the type of computer connected, the computer module 16 decodes the data from the bus 14. The computer module 16 may be implemented, for example, by a cpu, memory and i/o circuits; a single chip computer; an application specific integrated circuit; field programmable gate arrays; or other programmable circuits.

In the preferred embodiment, the encoded signals on the bus 14 are supplied to all of the peripheral modules 12, computer modules 16 and the controller 18 at the same time. Only the module or controller that is assigned the encoded address responds to the encoded signals. Where the address corresponds to one of the computer modules 16, the associated computer module decodes the signals and sends them to the attached computer 22. Where the address corresponds to the controller 18, the signals are decoded by the controller 18. The controller 18 may be implemented, for example, by a cpu, memory and i/o circuits; a single chip computer; an application specific integrated circuit; field programmable gate arrays; or other programmable circuits. The controller 18 may be a separate module, contained in a module 12, 16 or not modularized at all.

In the preferred embodiment, the address for the encoded data is supplied to the peripheral modules 12 by the controller 18 via the bus 14. The address is selected by, for example, special keyboard "hot-keys" (e.g., unusual combinations of keystrokes) typed on a keyboard connected to a peripheral module 12 that are automatically directed by the peripheral module 12 to the controller 18. The controller 18 may also respond to the "hot-keys" by generating an on-screen display (not shown) for further selections by keyboard or mouse connected to a peripheral module 12. The address may also be determined by switches (not shown) directly connected to the controller 18.

Figure 2:
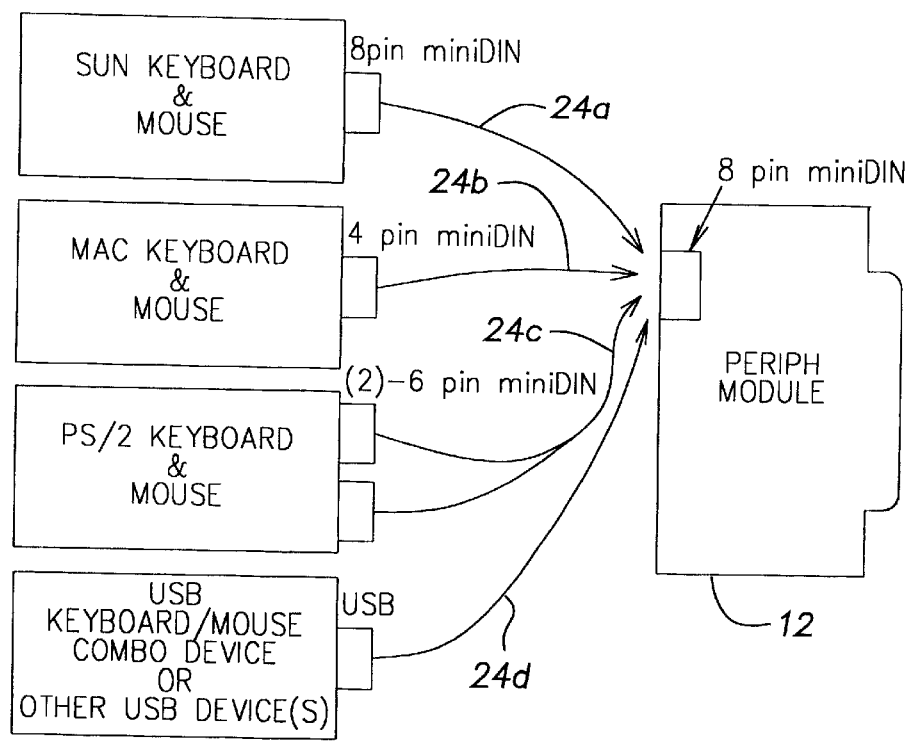
FIG. 2 is a block diagram of a peripheral module according to the invention.

In the preferred embodiment, a peripheral module 12 determines the type of peripheral connected by use of cables 24a, 24b, 24c, 24d (FIG. 2) with connectors that will physically connect only to a particular type peripheral. The cables preferredly include internal address jumpers that identify the type of peripheral to the peripheral module 12.

For example, a Sun Microsystems keyboard and mouse would plug into an female eight pin mini-DIN connector at one end of the cable 24a and the other end of the cable 24a would plug into a peripheral module 12 with a male eight pin min-DIN connector. A maximum of four pins are actually needed for the signals so four pins of the peripheral module plug can be used as address pins. The address pins are jumpered within the cable assembly in order to provide a unique identity for the type of cable/peripheral to the peripheral module 12.

Similarly, an Apple Macintosh keyboard and mouse would plug into a female four pin mini-DIN connector at one end of the cable 24b and the other end of the cable 24b would plug into a peripheral module 12 with a male eight pin min-DIN connector. The address pins are jumpered within the cable assembly in order to provide a unique identity for the type of cable/peripheral to the peripheral module 12.

Similarly, an IBM PS/2 style keyboard and mouse would plug into a pair of female six pin mini-DIN connectors at one end of the cable 24c and the other end of the cable 24c would plug into a peripheral module 12 with a male eight pin min-DIN connector. The address pins are jumpered within the cable assembly in order to provide a unique identity for the type of cable/peripheral to the peripheral module 12.

Similarly, a USB keyboard and mouse would plug into a female USB connector at one end of the cable 24d and the other end of the cable 24d would plug into a peripheral module 12 with a male eight pin min-DIN connector. The address pins are jumpered within the cable assembly in order to provide a unique identity for the type of cable/peripheral to the peripheral module 12.

Figure 3:
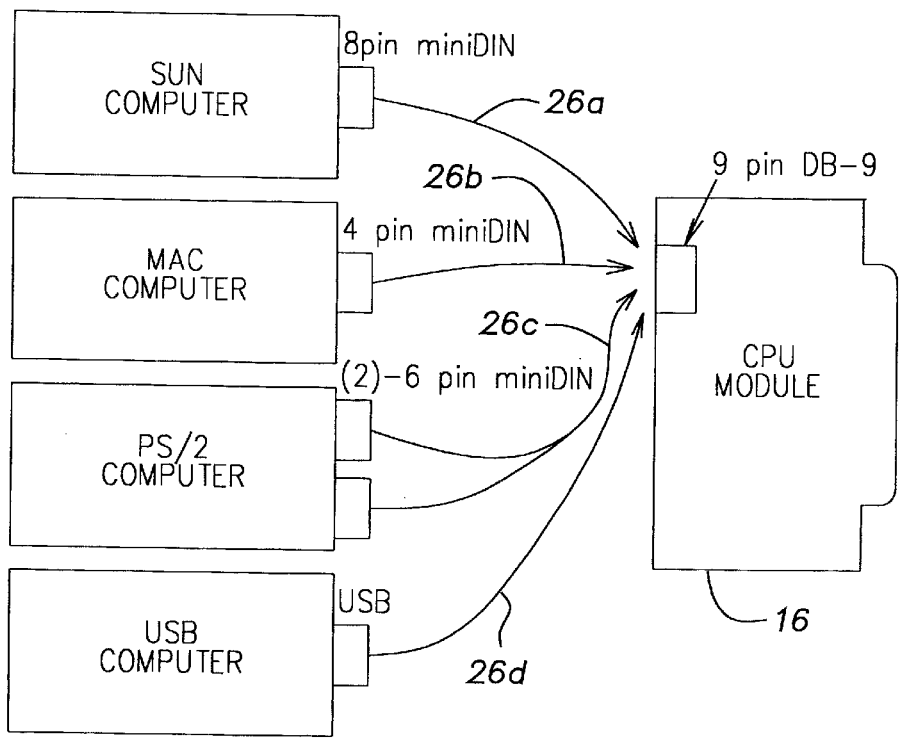
FIG. 3 is a block diagram of a computer module according to the invention.

Similarly, a computer module 16 determines the type of computer connected by use of cables 26a, 26b, 26c, 26d (FIG. 3) with connectors that will physically connect only to a particular type computer. The cables preferredly include internal address jumpers that identify the type of computer connected to the computer module 16.

For example, a Sun Microsystems computer would accept a male eight pin mini-DIN connector at one end of the cable 26a and the other end of the cable 26a would plug into a computer module 16 with a male nine pin DB-9 connector. The address pins are jumpered within the cable assembly in order to provide a unique identity for the type of cable/peripheral to the computer module 16.

Similarly, an Apple Macintosh computer would accept a male four pin mini-DIN connector at one end of the cable 26b and the other end of the cable 26b would plug into a computer module 16 with a male nine pin DB-9 connector. The address pins are jumpered within the cable assembly in order to provide a unique identity for the type of cable/peripheral to the computer module 16.

Similarly, an IBM PS/2 style computer would accept two male six pin mini-DIN connectors at one end of the cable 26c and the other end of the cable 26c would plug into a computer module 16 with a male nine pin DB-9 connector. The address pins are jumpered within the cable assembly in order to provide a unique identity for the type of cable/peripheral to the computer module 16.

Similarly, a USB computer would accept a male USB connector at one end of the cable 26d and the other end of the cable 26d would plug into a computer module 16 with a male nine pin DB-9 connector. The address pins are jumpered within the cable assembly in order to provide a unique identity for the type of cable/peripheral to the computer module 16.

In operation, a desired peripheral 20 is connected to the switch 10 by a cable (e.g., cable 24a). Based on the cable, the peripheral module 12 modifies its operation to correspond to the connected peripheral 20. The peripheral module 12 translates data from the peripheral 20 to data for the bus 14 including not only the data from the peripheral 20, but also, the address of the desired computer module 16 and the type of device. The data travels on the bus 14 to the computer module 16. The desired computer module 16 translates the data from the bus 14 to data for the appropriate type computer based on the cable (e.g., 26d) connected between the desired computer 22.

The present invention allows USB peripherals to be used with non-USB computers and vice versa, while still permitting the use of conventional non-USB peripherals with conventional non-USB computers. In addition, it permits the sharing of the new types of peripherals being planned and manufactured for use on the with the Universal Serial Bus.

It should be noted that while the preferred embodiment uses a data bus as the switcher to move information between selected modules, it is also possible to connect the modules using a crosspoint switch, parallel address, shift registers or any other signal routing techniques known in the art. The peripheral interfaces translate the specific signals to a common "language", a switcher routes the signals to the proper computer interface, and the computer interface then translate the common "language" to the appropriate specific signals.

For the ease of understanding, the flow of data has been described as from the peripherals to the computers, but in the preferred embodiment, the flow of data is bidirectional. This is particularly important when using USB devices that are output or bidirectionally oriented (e.g., modem, printer, scanner, audio device).

It should also be noted that for KVM switches there is also a switched video path (not shown) between the computers and remote monitors (which may also include on-screen displays from the switch 10). Because of the high bandwidth requirements, video is typically directly switched with a crosspoint switch under the control of the controller 18.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A switch for connecting a computer peripheral to one of a plurality of computers, said switch comprising:
   at least one peripheral interface, said peripheral interface being operably connectable to said computer peripheral;
   a plurality of computer interfaces, each of said computer interfaces being operably connectable to a respective computer, wherein at least one of said at least one peripheral interface and said plurality of computer interfaces is a USB interface; and a switcher for selectively establishing communication between said at least one peripheral interface and a desired one of said plurality of computer interfaces.

2. A switch according to claim 1, having a plurality of said peripheral interfaces operably connectable to respective computer peripherals.

3. A switch according to claim 2, wherein a non-USB and a USB peripheral interface are included in a single peripheral interface module.

4. A switch according to claim 1, wherein a non-USB and a USB computer interface are included in a single computer interface module.

5. A switch according to claim 1, wherein a non-USB and a USB peripheral interface are included in a single peripheral interface module and a non-USB and a USB computer interface are included in a single computer interface module.

6. A switch for connecting a desired one of a plurality of computer peripherals to one of a plurality of computers, said switch comprising:

at least one non-USB peripheral interface operably connectable to a respective computer peripheral;

at least one USB peripheral interface operably connectable to another respective computer peripheral;

at least one USB computer interface operably connectable to a respective computer;

at least one non-USB computer interface operably connectable to another respective computer;

a switcher for selectively establishing communication between a desired peripheral interface and a desired computer interface, thereby connecting said desired computer peripheral to said one of a plurality of computers.

7. A switch according to claim 6, wherein a non-USB and a USB peripheral interface are included in a single peripheral interface module and a non-USB and a USB computer interface are included in a single computer interface module.

8. A switch for connecting a computer peripheral to one of a plurality of computers, said switch comprising:

a USB peripheral interface operably connectable to said computer peripheral;

a plurality of non-USB computer interfaces operably connectable to a respective computer; and a switcher for selectively establishing communication between said USB peripheral interface and a desired one of said plurality of non-USB computer interfaces.

9. A switch according to claim 8, having a plurality of additional USB or non-USB peripheral interfaces operably connectable to respective computer peripherals.

10. A switch according to claim 8, having a plurality of additional non-USB or USB computer interfaces operably connectable to respective computers.

11. A switch according to claim 8, having a plurality of USB or non-USB peripheral interfaces operably connectable to respective computer peripherals and plurality of USB or non-USB computer interfaces operably connectable to respective computers.

12. A switch for connecting a computer peripheral to one of a plurality of computers, said switch comprising:

a non-USB peripheral interface operably connectable to said computer peripheral;

a plurality of USB computer interfaces operably connectable to a respective computer; and a switcher for selectively establishing communication between said non-USB peripheral interface and a desired one of said computer plurality of interfaces.

13. A switch according to claim 12, having a plurality of additional non-USB or USB peripheral interfaces operably connectable to respective computer peripherals.

14. A switch according to claim 12, having a plurality of additional USB or non-USB computer interfaces operably connectable to respective computers.

15. A switch according to claim 12, having a plurality of USB or non-USB computer interfaces operably connectable to respective computer peripherals and plurality of USB or non-USB computer interfaces operably connectable to respective computers.

* * * * *

UNITED STATES PATENT AND TRADEMARK OFFICE
CERTIFICATE OF CORRECTION

PATENT NO. : 6,324,605 B1
DATED : November 27, 2001
INVENTOR(S) : Jarrod S. Rafferty and Elizabeth L. Craddock It is certified that error appears in the above-identified patent and that said Letters Patent is hereby corrected as shown below:

Column 2,
Line 18, please delete "non-USE" and insert therefor -- non-USB --;
Line 22, please delete "interface" and insert therefor -- interfaces --;
Line 35, please delete "The. $J^2c$" and insert therefor -- The $i^2c$ --; and
Line 39, please delete "Un" and insert therefor -- on --.

Signed and Sealed this

Sixth Day of August, 2002

*Attest:*

JAMES E. ROGAN
*Attesting Officer*  *Director of the United States Patent and Trademark Office*

UNITED STATES PATENT AND TRADEMARK OFFICE
CERTIFICATE OF CORRECTION

PATENT NO. : 6,324,605 B1
DATED : November 27, 2001
INVENTOR(S) : Jarrod S. Rafferty and Elizabeth L. Craddock It is certified that error appears in the above-identified patent and that said Letters Patent is hereby corrected as shown below:

Column 6,
Line 27, please delete "said computer plurality of interfaces" and insert therefor -- said plurality of computer interfaces --.

Signed and Sealed this

Twentieth Day of September, 2005

JON W. DUDAS
*Director of the United States Patent and Trademark Office*

US006324605C1

(12) EX PARTE REEXAMINATION CERTIFICATE (6314th)

United States Patent
Rafferty et al.

(10) Number: US 6,324,605 C1
(45) Certificate Issued: Jul. 22, 2008

(54) COMPUTER AND PERIPHERAL SWITCH WITH USB

(75) Inventors: Jarrod S. Rafferty, Kent, OH (US); Elizabeth L. Craddock, Lyndhurst, OH (US)

(73) Assignee: Video Products, Inc., Aurora, OH (US)

Reexamination Request:
No. 90/007,856, Dec. 23, 2005

Reexamination Certificate for:
Patent No.: 6,324,605
Issued: Nov. 27, 2001
Appl. No.: 09/209,016
Filed: Dec. 10, 1998

Certificate of Correction issued Aug. 6, 2002.

Certificate of Correction issued Sep. 20, 2005.

(51) Int. Cl.
*G06F 13/40* (2006.01)

(52) U.S. Cl. .............................. 710/100; 710/62; 710/63
(58) Field of Classification Search .................. 710/100, 710/131, 129, 62, 63
See application file for complete search history.

(56) References Cited

U.S. PATENT DOCUMENTS

| 4,468,612 A | 8/1984 | Starr |
| 4,876,712 A | 10/1989 | Brint et al. |
| 4,972,470 A | 11/1990 | Farago |

(Continued)

FOREIGN PATENT DOCUMENTS

| DE | 198 19 567 A1 | 4/1999 |
| DE | 299 01 556 U1 | 9/1999 |
| EP | 0 962 663 A2 | 3/2000 |
| EP | 0 982 663 A2 | 3/2000 |
| GB | 2 350 212 A | 11/2000 |
| GB | 2 352 540 A | 1/2001 |
| JP | 10187303 A | 7/1998 |
| JP | 10-301899 | 11/1998 |
| JP | 11-259261 | 9/1999 |
| WO | 98/12641 A1 | 3/1998 |

OTHER PUBLICATIONS

P.I. Engineering, Y–mouse® "Y–mouse® Keyboard & Mouse Adapter," 1998, 6 pages.
Intel Press Release, "USB Momentum Builds As Vendors Unleash New Wave of USB Products to Accompany Windows 98" http://www.intel.com/pressroom/archive/releases/US062598.HTM, pp. 1–4.
PCWorld, "Belkin Components USB Parallel Adapter," Mar. 31, 1998, pp. 1 of 1, http://www.pcworld.com/resource/printable/article/0,aid,22966,00.asp.
GeniDo News Release, Usar Genido™ Single IC Converts Serial, Parallel and PS/2 to USB, Nov. 16, 1998, pp. 1–2, http://web.archive.org/web/1999012902424822/www.usar.com/whatsn/nrgido.htm.
Craig Crossman, The Miami Herald Computer Column, "KR–ACC–NO: MI–COMPUTING–COL," Sep. 28, 1998, pp. 1–2.
iMac USB Watch, "usb peripheral watch," pp. 1–8, http://www.theimac.com/usb.shtml.
Kelly Spang, "Holding Pattern: Microsoft's DOJ Problems Have USB Vendors In Quandry—Release Dates For USB Products Uncertain," May 25, 1998, pp. 1–2.
USAR Systems, Inc. "Single IC that converts serial and PS/2 data to USB" 1999, pp. 1–13.
MacWeek vol. 12, No. 29, Aug. 3, 1998, Christina Follman, "Griffin to grant iMac ADB port", p. 23.
"iMac USB to ADB Adapter", available from http.//www–griffintechnology.com/imac/imate_ds.html.

*Primary Examiner*—Ovidio Escalante

(57) ABSTRACT

A switch for connecting a desired peripheral to a desired computer uses a peripheral interface to translate either Universal Serial Bus (USB) or non-USB peripheral data to a common data format, the data is then routed to a computer interface that translates the common data format to either USB or non-USB computer data.

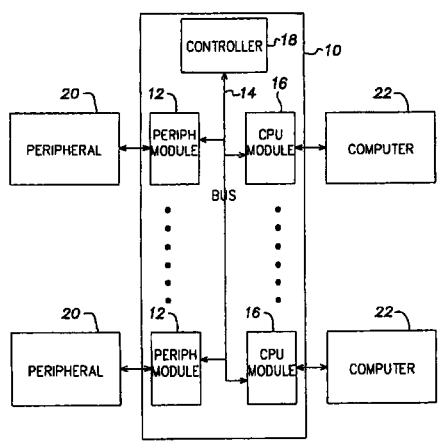

U.S. PATENT DOCUMENTS

| | | |
|---|---|---|
| 5,181,858 A | 1/1993 | Matz et al. |
| 5,226,123 A | 7/1993 | Vockenhuber |
| 5,330,370 A | 7/1994 | Reddersen et al. |
| 5,347,113 A | 9/1994 | Reddersen et al. |
| 5,369,593 A | 11/1994 | Papamarcos et al. |
| 5,499,377 A | 3/1996 | Lee |
| 5,524,362 A | 6/1996 | Quandt et al. |
| 5,542,053 A | 7/1996 | Bland et al. |
| 5,613,096 A | 3/1997 | Danknick |
| 5,664,229 A | 9/1997 | Bhargava et al. |
| 5,699,533 A | 12/1997 | Sakai |
| 5,721,842 A | 2/1998 | Beasley et al. |
| 5,724,529 A | 3/1998 | Smith et al. |
| 5,734,334 A | 3/1998 | Hsieh et al. |
| 5,752,032 A | 5/1998 | Keller et al. |
| 5,758,099 A | 5/1998 | Grieco et al. |
| 5,761,447 A | 6/1998 | Knox et al. |
| 5,761,448 A | 6/1998 | Adamson et al. |
| 5,768,568 A | 6/1998 | Inui et al. |
| 5,781,748 A | 7/1998 | Santos et al. |
| 5,784,581 A | 7/1998 | Hannah |
| 5,784,702 A | 7/1998 | Greenstein et al. |
| 5,799,171 A | 8/1998 | Kondou |
| 5,835,791 A | 11/1998 | Goff et al. |
| 5,841,424 A | 11/1998 | Kikinis |
| 5,864,708 A | 1/1999 | Croft et al. |
| 5,903,777 A | 5/1999 | Brief |
| 5,935,224 A | 8/1999 | Svancarek et al. |
| 5,991,546 A | 11/1999 | Chan et al. |
| 6,040,792 A | 3/2000 | Watson et al. |
| 6,044,428 A | 3/2000 | Rayabhari |
| 6,069,615 A | 5/2000 | Abraham et al. |
| 6,073,188 A | 6/2000 | Fleming |
| 6,098,130 A | 8/2000 | Wang |
| 6,131,134 A | 10/2000 | Huang et al. |
| 6,141,719 A | 10/2000 | Rafferty et al. |
| 6,151,645 A | 11/2000 | Young et al. |
| 6,199,128 B1 | 3/2001 | Sarat |
| 6,216,188 B1 | 4/2001 | Endo et al. |
| 6,256,687 B1 | 7/2001 | Ellis et al. |
| 6,279,060 B1 | 8/2001 | Luke et al. |
| 6,324,605 B1 | 11/2001 | Rafferty et al. |
| 6,356,968 B1 * | 3/2002 | Kishon ........................ 710/62 |
| 6,389,495 B1 | 5/2002 | Larky et al. |
| 6,549,966 B1 | 4/2003 | Dickens et al. |
| 6,622,195 B2 | 9/2003 | Osakada et al. |

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 8–15 is confirmed.

Claims 1 and 3–7 are determined to be patentable as amended.

Claim 2, dependent on an amended claim, is determined to be patentable.

New claims 16–39 are added and determined to be patentable.

1. A switch for connecting a computer peripheral to one of a plurality of computers, said switch comprising:
    at least one peripheral interface, said peripheral interface being operably connectable to said computer peripheral;
    a plurality of computer interfaces, each of said computer interfaces being operably connectable to a respective computer, wherein at least one of said at least one peripheral interface [and] *is a USB interface or at least one of* said plurality of computer interfaces is a USB interface; and
    a switcher for selectively establishing communication between *a desired one of* said at least one peripheral interface and a desired one of said plurality of computer interfaces;
    *wherein one of said desired interfaces is a USB interface and the other of said desired interfaces in a non-USB interface.*

3. A switch according to claim [2] *1*, wherein [a] *said* peripheral interface comprises a single connector for connecting to either a non-USB [and] *computer peripheral or a* USB *computer* peripheral [interface are included in a single peripheral interface module].

4. A switch according to claim 1, wherein [a] *said computer interface comprises a single connector for connecting to either a* non-USB [and] *computer or a* USB *computer* [interface are included in a single interface module].

5. A switch according to claim 1, wherein [a] *said peripheral interface comprises a single connector for connecting to either a* non-USB [and] *computer peripheral or a* USB peripheral [interface are included in a single peripheral interface module] and [a] *said computer interface comprises a single connector for connecting to either a* non-USB [and] *computer or a* USB computer [interface are included in a single computer interface module].

6. A switch for connecting a desired one of a plurality of computer peripherals to one of a plurality of computers, said switch comprising:
    at least one non-USB peripheral interface operably connectable to a respective computer peripheral *that is a non-USB peripheral*;
    at least one USB peripheral interface operably connectable to another respective computer peripheral *that is a USB peripheral*;
    at least one USB computer interface operably connectable to a respective computer *that is a USB computer*;
    at least one non-USB computer interface operably connectable to another respective computer *that is a non-USB computer*; and
    a switcher for selectively establishing communication between a desired peripheral interface and a desired computer interface, thereby connecting said desired computer peripheral to said one of a plurality of computers;
    *wherein communication is established between said desired peripheral interface and said desired computer interface irrespective of whether said desired peripheral interface is a USB interface or a non-USB interface and irrespective of whether said desired computer interface is a USB interface or a non-USB interface.*

7. A switch according to claim 6, wherein [a] *at least one non-USB peripheral interface or at least one USB peripheral interface comprises a single connector for connecting said switch to either a* non-USB [and] *peripheral or a* USB peripheral [interface are included in a single peripheral interface module and a non-USB and a USB computer interface are included in a single computer interface module].

16. *A switch according to claim 1, wherein said computer peripheral is a USB keyboard and/or a non-USB mouse.*

17. *A switch according to claim 1, wherein said computer peripheral is a non-USB keyboard and/or a non-USB mouse.*

18. *A switch according to claim 17, wherein said at least one peripheral interface comprises a single connector that is operably connectable to both a keyboard and a mouse.*

19. *A switch according to claim 1, wherein said desired one of said at least one peripheral interface and a desired one of said plurality of computer interfaces communicate via a non-USB bus.*

20. *A switch according to claim 19, wherein said non-USB bus is an i2c bus.*

21. *A switch according to claim 6, wherein at least one non-USB computer interface or at least one USB computer interface comprises a single connector for connecting said switch to either a non-USB connector on a non-USB computer or a USB connector on a USB computer.*

22. *A switch according to claim 6, wherein said non-USB peripheral is a non-USB keyboard and/or a non-USB mouse and said USB peripheral is a USB keyboard and/or a USB mouse.*

23. *A switch according to claim 22, wherein said non-USB peripheral interface comprises a single connector that is operably connectable to both a non-USB keyboard and a non-USB mouse and said USB peripheral interface comprises a single connector that is operably connectable to both a USB keyboard and a USB mouse.*

24. *A switch according to claim 6, wherein communication is established between a desired peripheral interface and a desired computer interface via a non-USB bus.*

25. *A switch according to claim 24, wherein said non-USB bus is an i2c bus.*

26. *A switch according to claim 24, wherein said non-USB peripheral is a non-USB keyboard and/or a non-USB mouse and said USB peripheral is a USB keyboard and/or a USB mouse.*

27. *A switch according to claim 8, wherein said computer peripheral is a USB keyboard and/or a USB mouse.*

28. *A switch according to claim 27, wherein said USB peripheral interface comprises a single connector that is operably connectable to both a USB keyboard and a USB mouse.*

29. A switch according to claim 8, wherein said USB peripheral interface comprises a single connector for connecting said switch to either a non-USB peripheral or a USB peripheral.

30. A switch according to claim 8, wherein said at least one of said plurality of non-USB computer interface comprises a single connector for connecting said switch to either a USB computer or a non-USB computer.

31. A switch according to claim 8, wherein communication is established between a desired USB peripheral interface and a desired non-USB computer interface via a non-USB bus.

32. A switch according to claim 31, wherein said computer peripheral is a USB keyboard and/or a USB mouse.

33. A switch according to claim 12, wherein said computer peripheral is a non-USB keyboard and/or a non-USB mouse.

34. A switch according to claim 33, wherein said non-USB peripheral interface comprises a single connector that is operably connectable to both a non-USB keyboard and a non-USB mouse.

35. A switch according to claim 12, wherein said non-USB peripheral interface comprises a single connector for connecting said switch to either a non-USB peripheral or a USB peripheral.

36. A switch according to claim 12, wherein said at least one of said plurality of USB computer interface comprises a single connector for connecting said switch to either a USB computer or a non-USB computer.

37. A switch according to claim 12, wherein communication is established between a desired non-USB peripheral interface and a desired USB computer interface via a non-USB bus.

38. A switch according to claim 37, wherein said computer peripheral is a non-USB keyboard and/or a non-USB mouse.

39. A switch according to claim 37, wherein said non-USB bus is an i2c bus.

\* \* \* \* \*